(12) United States Patent
Burke et al.

(10) Patent No.: US 9,046,346 B2
(45) Date of Patent: *Jun. 2, 2015

(54) DETERMINING A POSITION OF A MOBILE APPARATUS

(71) Applicant: Eastman Kodak Company, Rochester, NY (US)

(72) Inventors: Gregory Michael Burke, San Diego, CA (US); Gary Alan Kneezel, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/687,008

(22) Filed: Nov. 28, 2012

(65) Prior Publication Data

US 2014/0146309 A1 May 29, 2014

(51) Int. Cl.
| | |
|---|---|
| G01N 21/00 | (2006.01) |
| G01B 11/00 | (2006.01) |
| B41J 29/38 | (2006.01) |
| G01C 3/08 | (2006.01) |
| G01B 11/14 | (2006.01) |

(52) U.S. Cl.
CPC ............... *G01B 11/002* (2013.01); *B41J 29/38* (2013.01); *G01C 3/08* (2013.01); *G01B 11/14* (2013.01)

(58) Field of Classification Search
CPC .......... G01N 21/68; G01N 2015/1037; G01N 21/64; G01J 3/02; G01B 11/14; G01C 3/08; B25J 11/00

USPC .................................................... 356/72, 614
See application file for complete search history.

(56) References Cited

U.S. PATENT DOCUMENTS

| | | | |
|---|---|---|---|
| 6,116,707 A | 9/2000 | Avida | |
| 6,951,375 B2 | 10/2005 | Patton et al. | |
| 8,724,118 B1* | 5/2014 | Burke | 356/614 |
| 2014/0144376 A1* | 5/2014 | Burke | 118/323 |
| 2014/0146308 A1* | 5/2014 | Burke | 356/72 |

* cited by examiner

*Primary Examiner* — Tarifur Chowdhury
*Assistant Examiner* — Isiaka Akanbi
(74) *Attorney, Agent, or Firm* — Peyton C. Watkins (57) ABSTRACT

A method of determining a position of a mobile apparatus includes: firing a laser mounted on the mobile apparatus; rotating the laser and a first and second photo detector that are disposed proximate the laser while monitoring an amount of rotation; detecting a first amplitude of light received by the first photo detector and a second amplitude of light received by a second photo detector as a function of rotation; identifying a first orientation corresponding to perpendicularity of the laser to a position referencing structure; identifying a second orientation corresponding to perpendicularity of the laser to the position referencing structure; identifying a third orientation corresponding to perpendicularity of the laser to the position referencing structure; and calculating the position of the mobile apparatus based on the first orientation, the second orientation, the third orientation, and a predetermined distance associated with the position referencing structure.

29 Claims, 9 Drawing Sheets

DETERMINING A POSITION OF A MOBILE APPARATUS

CROSS REFERENCE TO RELATED APPLICATIONS

Reference is made to commonly assigned, co-pending U.S. patent application Ser. No. 13/686,998, concurrently filed herewith, entitled "Mobile Apparatus with Local Position Referencing Structure" by Greg Burke; and co-pending U.S. patent application Ser. No. 13/686,986, concurrently filed herewith, entitled "Mobile Apparatus with Local Position Referencing Elements" by Greg Burke; and co-pending U.S. patent application Ser. No. 13/686,992, concurrently filed herewith, entitled "Method of Positioning a Mobile Apparatus" by Greg Burke, the disclosures of which are herein incorporated by reference.

FIELD OF THE INVENTION

This invention relates generally to the field of motion-controlled mobile units, and more particularly to a mobile apparatus whose motion is controlled with reference to a local position referencing structure.

BACKGROUND OF THE INVENTION

A mobile apparatus can be controlled to perform an operation as a function of a position of the mobile apparatus. Such operations can include modifying a surface over which the mobile apparatus is moved, ejecting a liquid onto a medium, printing an image, fabricating a device, or cutting a surface, for example. The accuracy to which the position of the mobile apparatus must be known depends upon the operation to be performed and the quality of the resulting output that is required. For example, the print quality of a sign that is to be viewed at a long distance does not require as high a degree of positional accuracy of printing as does a poster-sized print of a photographic image. In addition, the placement of different portions of an image that are separated by white space is not as critical of the placement of different portions of an image that are adjacent to each other and printed on separate printing swaths.

U.S. Pat. No. 6,116,707 discloses a robotic plotting system in which a printhead is placed on a substantially flat horizontal surface upon which a recording medium is placed. The robotic plotter printhead is directed across the medium by infrared, ultrasound or microwave signals that are transmitted to the printhead from the periphery of the recording medium. The printhead includes a motorized drive mechanism that propels it across the surface of the recording medium using control signals. U.S. Pat. No. 6,951,375 discloses a wheeled vehicle that includes motors, encoders, and an inkjet printhead for printing on a large surface area or walkway.

What is needed is a simple, reliable and accurate way of determining the position of a mobile apparatus for performing an operation, such as printing, as a function of the position of the mobile apparatus. It is also advantageous for positioning reference structure to include a built-in distance measurement reference.

SUMMARY OF THE INVENTION

A method of determining a position of a mobile apparatus comprises: firing a laser that is mounted on the mobile apparatus; rotating as a unit the laser and a first and second photo detector that are disposed proximate the laser while monitoring an amount of rotation; detecting a first amplitude of light received by the first photo detector and a second amplitude of light received by a second photo detector as a function of the amount of rotation; identifying a first orientation corresponding to perpendicularity of the laser to a position referencing structure; identifying a second orientation corresponding to perpendicularity of the laser to the position referencing structure; identifying a third orientation corresponding to perpendicularity of the laser to the position referencing structure; and calculating the position of the mobile apparatus based on the first orientation, the second orientation, the third orientation, and a predetermined distance that is associated with the position referencing structure.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
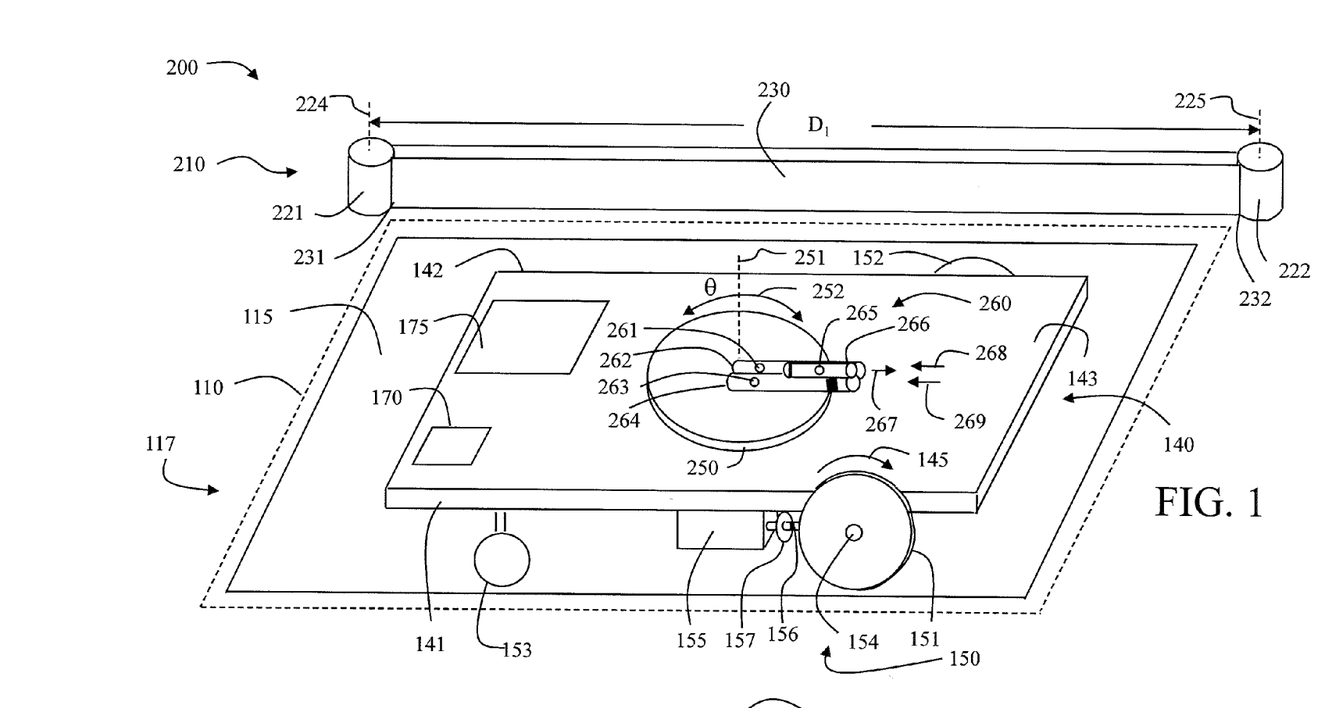
FIG. 1 schematically shows a position-referenced mobile system according to an embodiment of the invention.

FIG. 1 schematically shows a position-referenced mobile system 200 including a mobile apparatus 140, a controller 170 and a position referencing structure 210 according to an embodiment of the present invention. The mobile apparatus 140 is located within a position detection region 110, which can include a sheet of medium 115 lying flat on a horizontal table or floor, for example. The support surface, such as a horizontal table or floor, or the sheet of medium 115 that lies on the support surface, determines a plane of motion 117 of the mobile apparatus 140. It is noted that FIG. 1 is not to scale. The mobile apparatus 140 is shown artificially large compared to a position detection region 110 so that details of the mobile apparatus 140 can be seen more clearly. A typical length of the mobile apparatus 140 can be around several inches, while a typical length and width of the position detection region 110 can be around several feet.

The mobile apparatus 140 includes a chassis 143 having a first edge 141 and a second edge 142 that is opposite the first edge 141. A transport mechanism 150 for moving the mobile apparatus 140 along or substantially along the plane of motion 117 includes a first wheel 151 rotatably mounted near the first edge 141 and a second wheel 152 is rotatably mounted near the second edge 142. A first motor 155 provides power to rotate the first wheel 151 about a hub 154. A second motor 155 (not visible in FIG. 1) provides power to rotate the second wheel 152 independently of the first wheel 151. Both the first wheel 151 and the second wheel 152 can be independently driven by their respective motors 155 in a first rotational direction 145 (forward) or in a second rotational direction (reverse) opposite the first rotational direction 145. Driving the first wheel 151 in the first rotational direction 145 while also driving the second wheel 152 in the first rotational direction causes the mobile apparatus 140 to move from one location to a different location. The first wheel 151 is driven in the first rotational direction 145, while driving the second wheel 152 in the second rotational direction that is opposite the first rotational direction 145 causes the mobile apparatus 140 to rotate to a different orientation. At least one freely rotating ball or caster 153 helps to the support chassis 143 and is able to turn in any direction as required by movement of the driven first and second wheels 151 and 152. For improved motion control, it is preferable that the freely rotating ball 153 trails the first and second wheels 151 and 152 as they move the mobile apparatus 140. The trailing, freely rotating ball or caster 153 is shown in FIG. 1 as being near the first edge 141. There can also be another trailing freely rotating ball 153 (not shown) near the second edge 142. Rather than freely rotating balls or casters, the support can be provided by freely swiveling wheels (not shown). In other embodiments, the freely rotating ball or freely swiveling wheel (not shown) can be more centrally positioned between the first edge 141 and the second edge 142. In other embodiments (not shown) the transport mechanism can include independently driven motorized continuous tracks analogous to the continuous tracks used on bulldozers.

Figure 2:
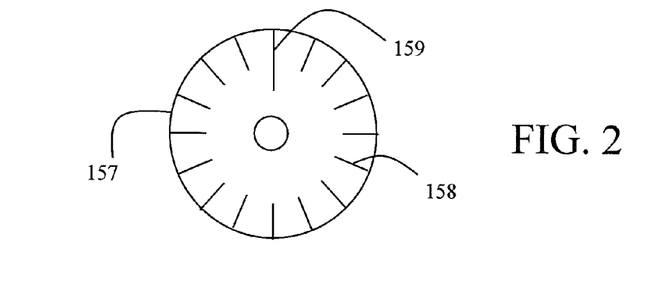
FIG. 2 schematically shows a rotary encoder.

A first rotary encoder 157 (FIG. 2) is mounted on a shaft 156 of first motor 155 in order to monitor an amount of rotation of first motor 155 and first wheel 151. Rotary encoder 157 typically includes a plurality of radial lines 158 (FIG. 2) disposed around the circumference of a disk. An optical sensor (not shown) detects rotation of the disk by high signals corresponding to light passing through transparent regions of the disk or low signals corresponding to light being blocked by the radial lines 158. For simplicity in FIG. 2, the radial lines 158 are shown as being spaced about every 22.5 degrees. In actual rotary encoders, the radial lines 158 are typically spaced about every degree. The rotary encoder 157 typically includes a detectable reference position 159. In the configuration shown in FIG. 2, the detectable reference position 159 is shown as an elongated radial line 158. A second rotary encoder 157 is mounted on a shaft of the second motor (not visible in FIG. 1) to monitor an amount of rotation of the second motor and the second wheel 152. Monitoring the first and second rotary encoders 157 while driving the first wheel 151 and the second wheel 152 in the same rotational direction (and knowing the diameters of the wheels), allows the calculation of a distance moved by the mobile apparatus 140. Monitoring the first and second rotary encoders 157 while driving the first wheel 151 and the second wheel 152 in opposite rotational directions (and knowing a distance between the wheels) permits the calculation of an amount of rotation by the mobile apparatus 140.

A rotatable position detection assembly 260 includes a first photo detector 261, a second photo detector 263 and a laser 265. In the configuration shown in FIG. 1, the first photo detector 261 is disposed within a first hollow tube 262, the second photo detector 263 is disposed within a second hollow tube 264, and the laser 265 is disposed within a cylindrical package 266. It is not required that the laser 265 have a cylindrical package 266, but such a package shape can be helpful in aligning the laser 265 such that its beam is emitted substantially parallel to the first hollow tube 262 and the second hollow tube 264. Also in the configuration shown in FIG. 1 and the schematic side view of FIG. 4, the first photo detector 261, the second photo detector 263 and the laser 265 are mounted on a turret 250 having a rotational axis 251 that is perpendicular to or substantially perpendicular to the plane of motion 117 of the mobile apparatus 140. A turret motor 255 (FIG. 4) rotates the turret 250 in a rotational direction 252 about a rotational axis 251. A rotary encoder 257 (similar to rotary encoder 157 described above with reference to FIG. 2) is mounted on a shaft 256 of the turret 255 (or alternatively on a shaft 254 of the turret motor 255 for monitoring an amount of rotation θ of the position detection assembly 260. A gear 258 associated with the shaft 254 of the turret motor 255 engages with a gear 259 associated with the shaft 256 of the turret 255 to provide rotational power for the turret 250. In other embodiments where there is no turret 250, the rotatable mobile apparatus 140 itself can function as a part of the rotatable position detection assembly 260 for orienting the first and second photo detectors 261 and 263 and the laser 265 in different directions. However, configurations having the turret 250 are advantaged in that it is not required to rotate the entire mobile apparatus 140 and are less susceptible to errors due to wheel slippage.

The first hollow tube 262, the second hollow tube 264 and the laser 265 are aligned parallel to one another and are closely positioned relative to one another. An advantageous configuration is schematically shown in the end view of FIG. 3 where a first axis 242 of the first hollow tube 262, the second axis 244 of the second hollow tube 264, and a third axis 245 of the laser 265 are arranged in a triangular relationship relative to each other. In particular the first axis 242 and the second axis 244 are disposed within a detection plane 217 that is parallel to or substantially parallel to the plane of motion 117 (FIG. 1), such that the third axis 245 of the laser 265 is disposed between the first axis 242 and the second axis 244 and is displaced from the detection plane 217. If the first and second hollow tubes 262, 264 and the laser 265 are aimed toward the positioning referencing structure 210 (FIG. 1), an incident beam 267 emitted from the laser 265 can be reflected from a portion of a surface of the position referencing structure 210 that is substantially perpendicular to the incident beam 267 such that it can be received as the first reflected beam 268 by the first photo detector 261 or as the second reflected beam 269 by the second photo detector 263. The first and second hollow tubes 262 and 264 are opaque in order to reduce the amount of stray light impinging on the first and second photo detectors 261 and 263 so that primarily the light received by the first and second photo detectors 261 and 263 is light from laser 265 that is reflected from a reflective surface such as the first and second reflective cylindrical surfaces 221 and 222. A typical diameter of the first and second hollow tubes 262 and 264 and of the incident beam 267 emitted from the laser 265 is about 3 millimeters. In the schematic view of FIG. 1, the first and second hollow tubes 262 and 264 and the cylindrical package 266 are shown as transparent so that the first and second photo detectors 261 and 263 and the laser 265 can be indicated. The controller 170, which in the embodiment shown in FIG. 1 is mounted on the mobile apparatus 140, interprets electrical signals provided by the first and second photo detectors 261 and 263 and makes calculations to determine position of the mobile apparatus 140. The controller 170 also interprets signals from the rotary encoders 157 for the first and second wheels 151 and 152 as well as the turret 250, sends signals for the motors 155 and 255 for moving or rotating the mobile apparatus 140 and the turret 250, and provides overall control of the operation of mobile apparatus 140. A power source 175 is also mounted on the mobile apparatus 140 and provides power for the motors 155 and 255, the controller 170, the laser 265, and other devices associated with the operation of the mobile apparatus 140.

Figure 4:
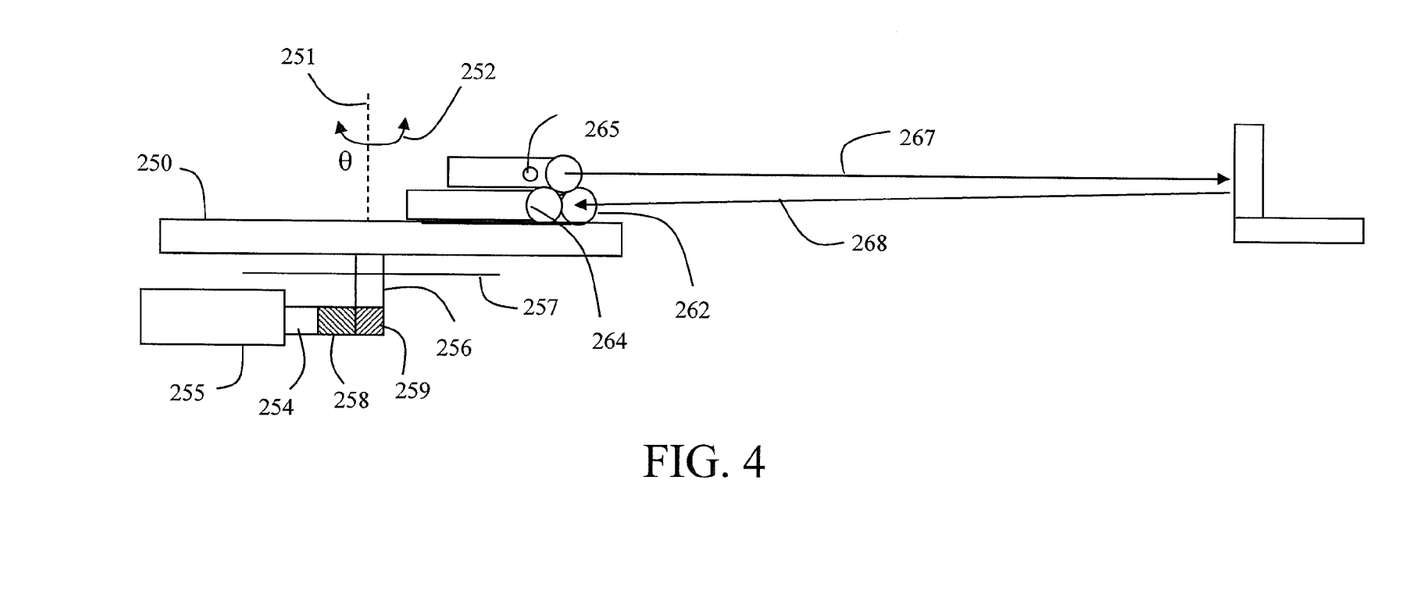
FIG. 4 shows a side view of a portion of the position-referenced mobile system of FIG. 1.

In the configuration shown in FIG. 1, the position referencing structure 210 is shown as being positioned near to but outside of the position detection region 110. The position detection region 110 can also be called a work space since it corresponds to a region in which mobile apparatus 140 (FIG. 1) can move and operate as a function of its position. The position referencing structure 210 includes a reflective linear reference member 230, a first reflective cylindrical surface 221 disposed at a first end 231 of linear reference member 230, and a second reflective cylindrical surface 222 disposed at a second end 232 of the linear reference member 230. An axis 224 of the first reflective cylindrical surface 221 is located at a predetermined distance $D_1$ from an axis 225 of a second reflective cylindrical surface 222. The axis 224 and the axis 225 are perpendicular or substantially perpendicular to the plane of motion 117. The linear reference member 230 and first and second reflective cylindrical surfaces 221 and 222 are observable by the first and second photo detectors 261 and 263 when the mobile apparatus 140 is located within the position detection region 110. However, a strong light signal will only be detected by the first photo detector 261 or the second photo detector 263 when the laser 265 is pointed toward the axis 224 of the first cylindrical surface 221, toward the axis 225 of the second reflective cylindrical surface 222, or perpendicularly toward the linear reference member 230. FIG. 4 schematically illustrates the incident beam 267 from the laser 265 being reflected as the first reflected beam 268 into the first hollow tube 262 from the linear reference member 230 (FIG. 1). Optionally, a color filter (not shown) can be included in front of the first and second photo detectors 261 and 263 in order to filter out wavelengths that do not correspond to the laser 265. A property of a reflective cylindrical surface is that as the orientation of the first and second hollow tubes 262 and 264 and the laser 265 changes, for example, as the turret 250 is rotated, a strong light signal will be detected by the first photo detector 261 or the second photo detector 264 over a very small range of angles where the incident beam 267 and the first reflected beam 268 are substantially perpendicular to the cylindrical surface such as first and second reflective cylindrical surfaces 221 and 222.

Figure 3:
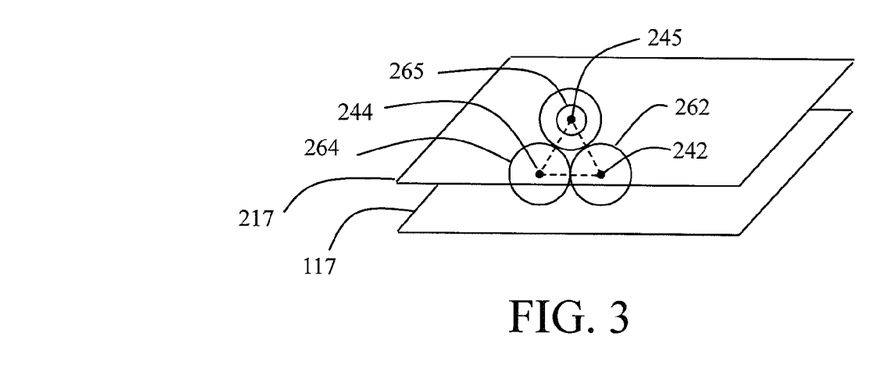
FIG. 3 is an end view showing a configuration of a laser and hollow tubes for a first photo detector and a second photo detector according to an embodiment of the invention.
Figure 5:
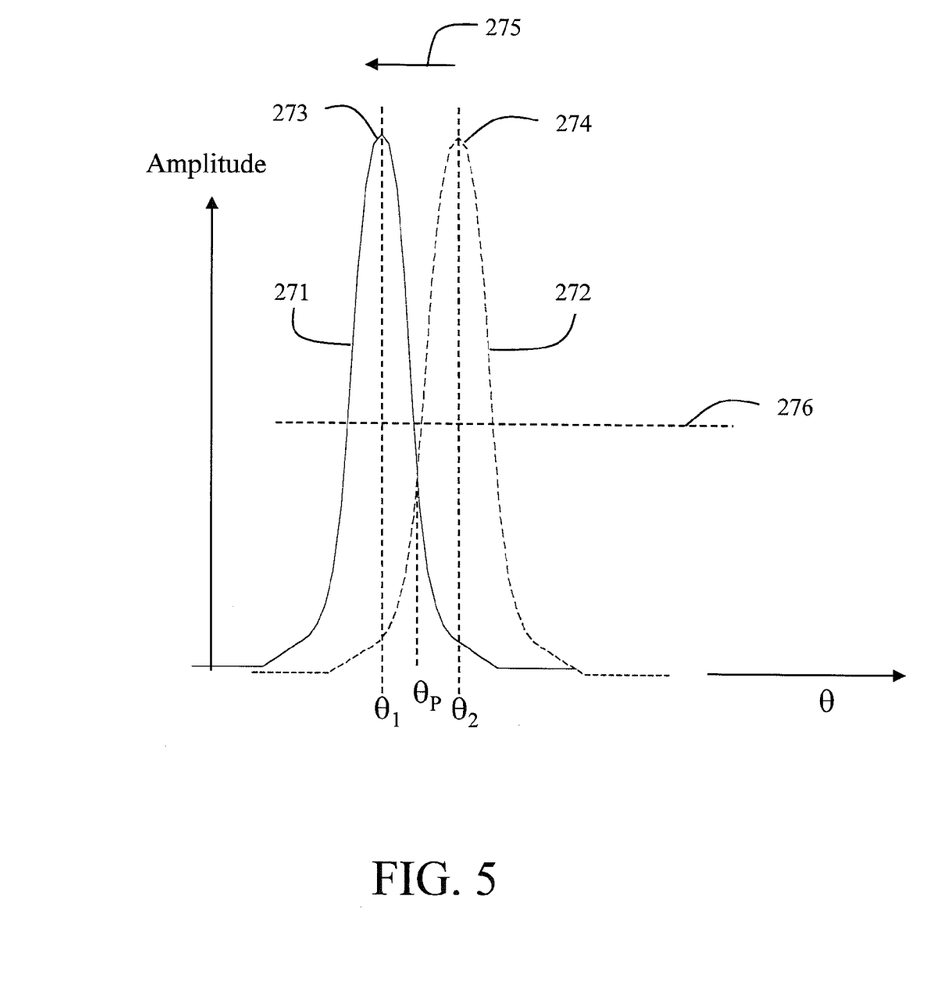
FIG. 5 illustrates signal amplitudes received by the first and second photo detectors as a function of rotation angle.

A method of identifying an orientation corresponding to perpendicularity of the laser 265 to a portion of the positioning reference structure 210 is illustrated in FIG. 5, which shows an signal amplitude 271 detected by the first photo detector 261 and a signal amplitude 272 detected by the second photo detector 263 as a function of rotation angle θ of the turret 250 (FIGS. 1 and 4). The signal amplitude 271 has a peak 273 at angle $\theta_1$ and the signal amplitude 272 has a peak 274 at angle $\theta_2$. The peaks 273 and 274 are detected at different angles because the first photo detector 261 and the second photo detector 263 are displaced from one another. With reference also to FIG. 3, since a third axis 245 of the laser 265 is midway between the first axis 242 of the first hollow tube 262 and the second axis 244 of the second hollow tube 264, the turret angle $\theta_p$ corresponding to the third axis 245 of the laser 265 being perpendicular to the portion of the position referencing structure 210 (FIG. 1) is midway between $\theta_1$ and $\theta_2$. In particular, by comparing a signal from the first photo detector 261 to a signal from the second photo detector 263 as a function of the amount of rotation, $\theta_p$ can be identified as the orientation such that further rotation of the turret 250 in a first direction 275 causes the signal amplitude 271 from the first photo detector 261 to increase and the signal amplitude 272 from the second photo detector 263 to decrease. Similarly at turret angle $\theta_p$, further rotation of the turret 250 in a direction opposite the first direction 275 causes the signal amplitude 271 from the first photo detector 261 to decrease and the signal amplitude 272 from the second photo detector 263 to increase. Actual signal amplitude data will include a number of noise peaks (not shown) that are significantly smaller in amplitude than the peaks 273 and 274. In order to avoid incorrectly identifying $\theta_p$ due to noise peaks, a predetermined threshold 276 can be defined. The orientation corresponding to perpendicularity of the laser 265 to a portion of the position reference structure 210 can include verifying that the signal amplitudes 271 and 272 at the peaks 273 and 274 respectively are at least as large as the predetermined threshold 276.

Figure 6:
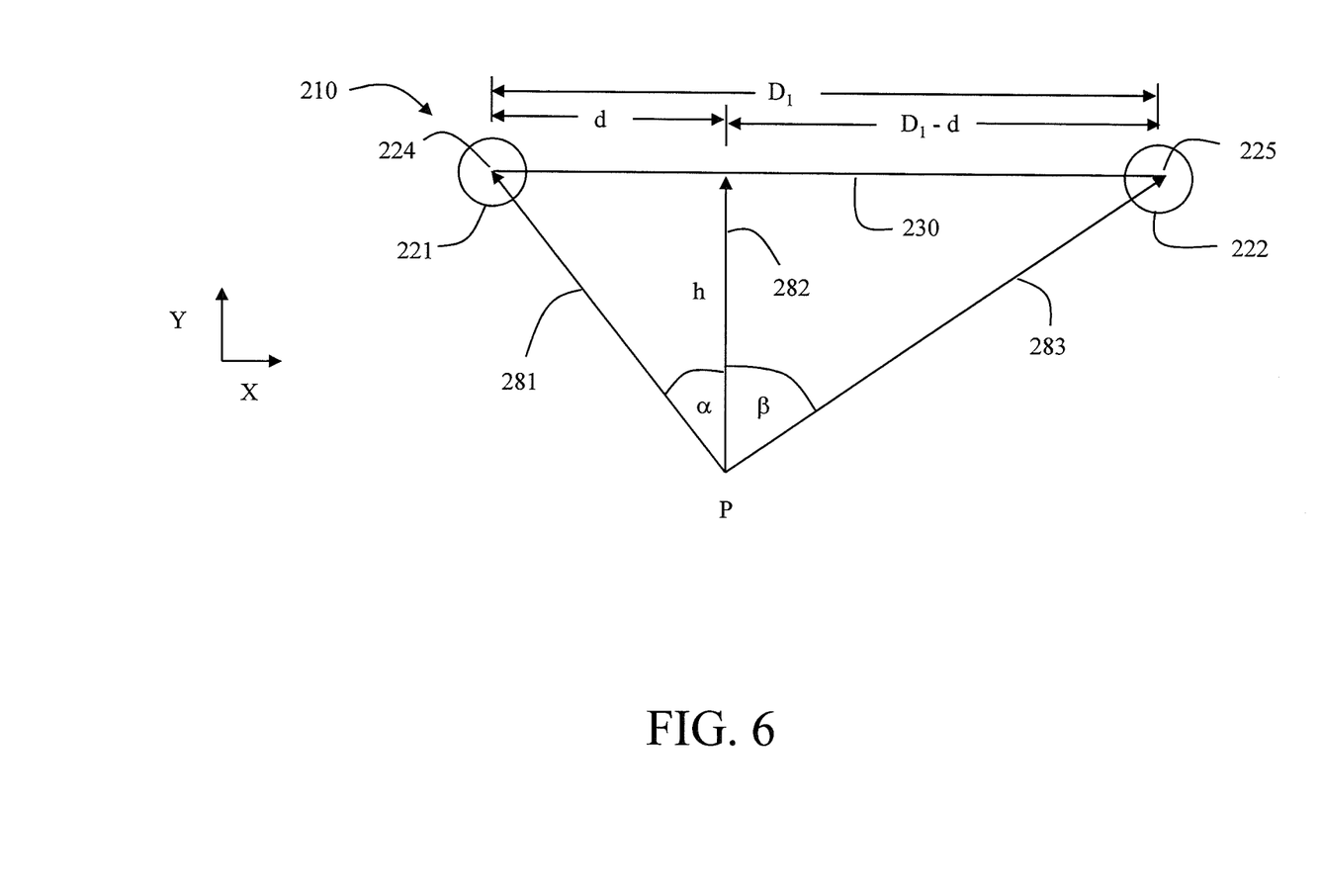
FIG. 6 is a schematic top view of a position referencing structure and illustrates how position of the mobile apparatus can be determined.

FIG. 6 is a schematic top view of the position referencing structure 210 and illustrates how (X,Y) coordinates of a position P of the mobile apparatus 140 (FIG. 1) can be determined. A first vector 281 from position P to the axis of the first reflective cylindrical surface 221 indicates a first orientation corresponding to perpendicularity of the laser 265 to the first reflective cylindrical surface 221. A second vector 282 from position P to the linear reference member 230 indicates a second orientation corresponding to perpendicularity of the laser 265 to the linear reference member 230. A third vector 283 from position P to the axis of the second reflective cylindrical surface 222 indicates a third orientation corresponding to perpendicularity of the laser 265 to the second reflective cylindrical surface 222. Define an XY coordinate system such that axis 224 of first cylindrical surface 221 is at the origin and linear reference member 230 is along the X axis. Then, since the distance between the axis 224 of the first reflective cylindrical surface 221 and the axis 225 of the second reflective cylindrical surface 222 is $D_1$, the coordinates of the axis 224 and the axis 225 are (0,0) and ($D_1$,0) respectively. Since the second vector 282 is perpendicular to the linear reference member 230 it is parallel to the Y axis. Let h be the distance between position P to the linear reference member 230 and let the second vector 282 intersect the linear reference member 230 a distance d from axis 224 of the first reflective cylindrical surface 221. Then in the configuration shown in FIG. 6, the coordinates of P are (d, −h). The Y coordinate of P is negative in this example since P is below the X axis. Angle α is measured using rotary encoder 257 (FIG. 4) to measure the difference in orientations of the turret 250 between the strong reflection corresponding to the perpendicular to first reflective cylindrical surface 221 and the strong reflection corresponding to the perpendicular to the linear reference member 230. Similarly angle β is the difference in orientations of the turret 250 between the strong reflection corresponding to the perpendicular to the linear reference member 230 and the strong reflection corresponding to the perpendicular to the second reflective cylindrical surface 222. Then by trigonometry, $$d = h/\tan\alpha = h\cot\alpha \qquad (1)$$

and $$D_1 d = h/\tan\beta = h\cot\beta \qquad (2),$$

so that $$D_1 = h(\cot\alpha + \cot\beta) \qquad (3),$$

so that $$h = D_1/(\cot\alpha + \cot\beta) \qquad (4)$$

and $$d = D_1 \cot\alpha/(\cot\alpha + \cot\beta) \qquad (5).$$

In other words, the (X,Y) coordinates of position P of the mobile apparatus 140 are determined by firing the laser 265 that is mounted on the mobile apparatus 140; rotating as a unit, the laser 265 and the first and second photo detectors 261 and 263 located near the laser 265 (for example by rotating the turret 250) while monitoring an amount of rotation using the rotary encoder 257; detecting and analyzing the first signal amplitude 271 of light received by the first photo detector 261 and the second signal amplitude 272 of light received by the second photo detector 263 as a function of the amount of rotation θ; identifying a first orientation (first vector 281) corresponding to perpendicularity of the laser 265 to the position reference structure 210 (in particular to the first reflective cylindrical surface 221); identifying a second orientation (the second vector 282) corresponding to perpendicularity of the laser 265 to the position reference structure 210 (in particular to linear reference member 230); identifying a third orientation (the third vector 283) corresponding to perpendicularity of the laser 265 to the position reference structure 210 (in particular to the second cylindrical surface 222); and calculating the position coordinates for position P of mobile apparatus 140 based on the first orientation, the second orientation, the third orientation and a predetermined distance $D_1$ that is associated with the position reference structure 210. The steps of identifying orientations and calculating position coordinates are done using the controller 170 (FIG. 1).

Figure 7:
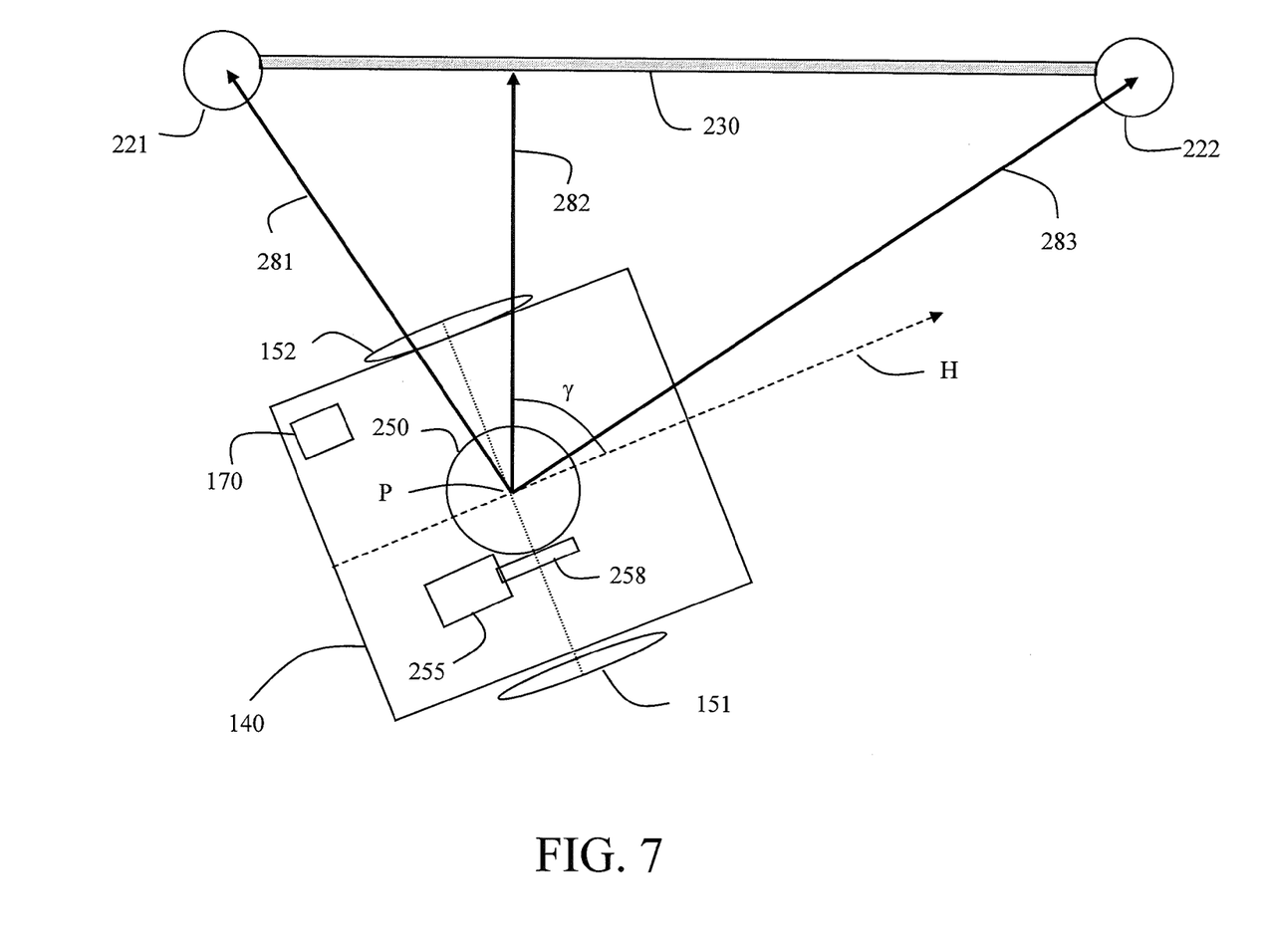
FIG. 7 illustrates how a new heading of the mobile apparatus can be set with reference to a linear reference member.

After position P has been calculated, the mobile apparatus 140 can be moved to a second location while the distance moved from calculated position P to the second location is monitored, for example using the rotary encoders 157 (FIG. 2) to measure how much a wheel (typically both the first wheel 151 and second wheel 152) of known diameter has rotated. It is typically important not only to monitor the distance moved by the mobile apparatus 140, but also to move along a desired heading. As shown schematically in the top view of FIG. 7, a new heading H can be set with reference to the linear reference member 230. Once the orientation of the turret 250 corresponding to perpendicularity of the laser 265 and the first and second photo detectors 261 and 263 to the linear reference member 230 (i.e. the second vector 282) has been determined, the motors 155 (FIG. 1) for the first wheel 151 and the second wheel 152 can be servo-controlled using the controller 170 to preserve perpendicularity to the linear reference member 230 by monitoring the signal amplitude 271 and the signal amplitude 272 (FIG. 5) during further motion. Then if the controller 170 instructs the turret motor 255 to turn the turret 250 by a desired angle γ relative to the second vector 282 corresponding to the change in heading while monitoring rotation using the rotary encoder 257 (FIG. 4), the servo-controlled motors 155 will adjust rotation of the first wheel 151 and the second wheel 152 to preserve perpendicularity of the laser 265 and the first and second photo detectors 261 and 263 to the linear reference member 230. As a result, mobile apparatus 140 will reorient itself along the desired heading H. Continued forward movement of the mobile apparatus 140 will be along the desired heading H by preserving perpendicularity of the laser 265 and the first and second photo detectors 261 and 263 to the linear reference member 230 as mobile apparatus 140 moves. By measuring distance travelled using the rotary encoders 157 along heading H while monitoring signals from the first and second photo detector 261 and 263 to preserve straight line motion along heading H, a position of the new location can be calculated.

Figure 8:
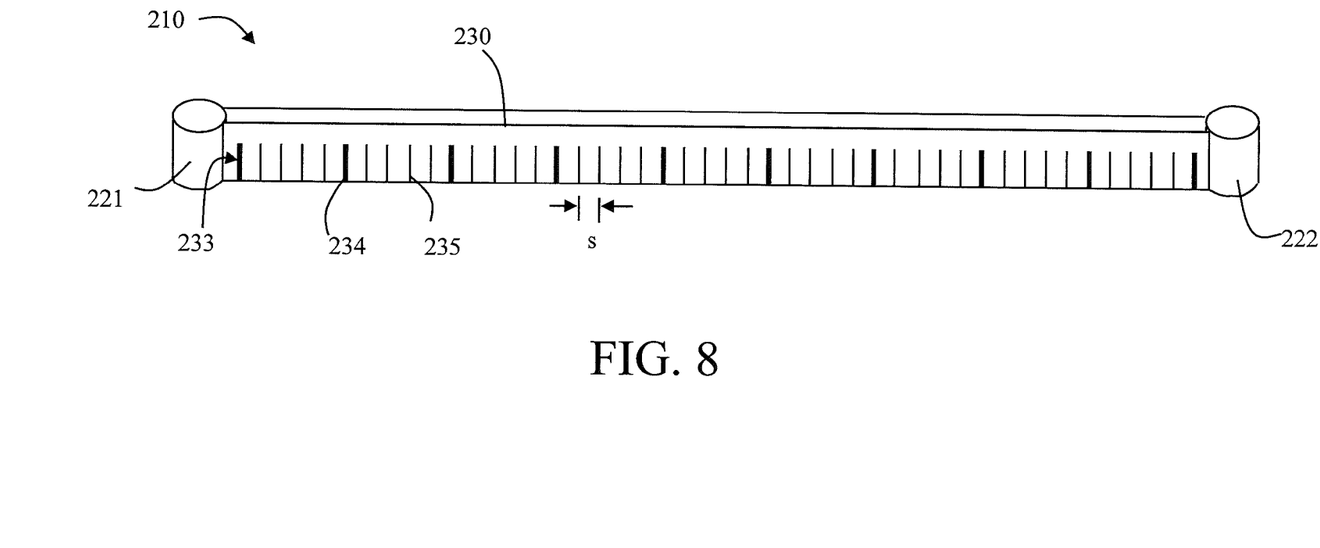
FIG. 8 shows an embodiment of a linear reference member with reference markings.

Improvements in the accuracy, reliability or speed of calculating new location positions or headings are provided in other embodiments. As described above with reference to FIG. 6, after position P has been calculated, the mobile apparatus 140 can be moved to a second location while the distance moved from calculated position P to the second location is monitored, for example using rotary encoders 157 (FIG. 2) to measure how much a wheel (typically both first wheel 151 and second wheel 152) of known diameter has rotated. In some instances, slippage of the first and second wheels 151 and 152 can introduce errors into the calculation of the new position. FIG. 8 shows the position reference structure 210 such that the linear reference member 230 includes a plurality of reference markings 233. A set of first reference markings 234 have a different width than a width of a set of second reference markings 235 and are regularly interspersed. In the example of FIG. 8, every fifth reference marking 233 is a first reference marking 234 with a wider width than the width of the second reference markings 235. In this way, the controller 170 (FIG. 1) can do a check of its calculated position according to the absolute reference markings 233 provided on the linear reference member 230. Reference markings are spaced apart by a spacing s that is larger than a width of a beam from the laser 265. In this way, the reference markings 233 can be well resolved. The controller 170 can interpret the signal amplitudes 271 and 272 (FIG. 5) to tell the difference between a reference marking 233 and a condition of perpendicularity in the following way. As described above with reference to FIG. 5, a condition of perpendicularity to the linear reference member 230 corresponds to an orientation where further rotation in one direction causes the signal amplitude 271 to increase while the signal amplitude 272 decreases, and vice versa for rotation in the opposite direction. By contrast, as a reference marking 233 comes into view of the first photo detector 261 and then the second photo detector 263, the signal amplitude 271 will decrease and then the signal amplitude 272 will also decrease. The extent of the decrease as a function of rotation will depend on the width of the reference marking 233.

Figure 9:
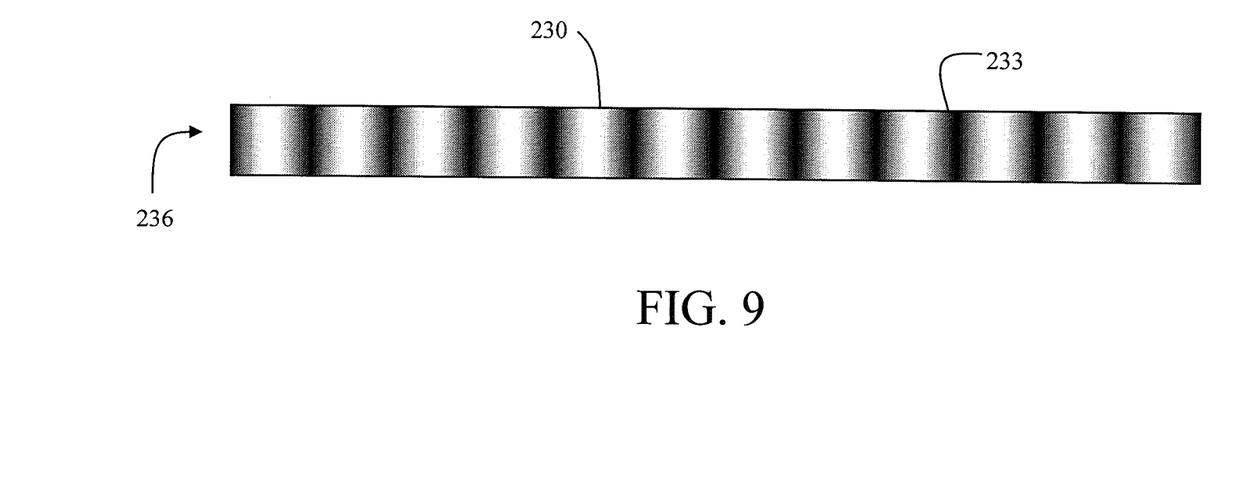
FIG. 9 shows an embodiment of a linear reference member with a shading gradient.

FIG. 9 shows the linear reference member 230 where the reference markings 233 include a periodic shading gradient 236 along the length of the linear reference member 230. A periodic shading gradient 236 can provide a more precise indication of location in analog fashion than the line-style reference markings 233 of FIG. 8.

Figure 10:
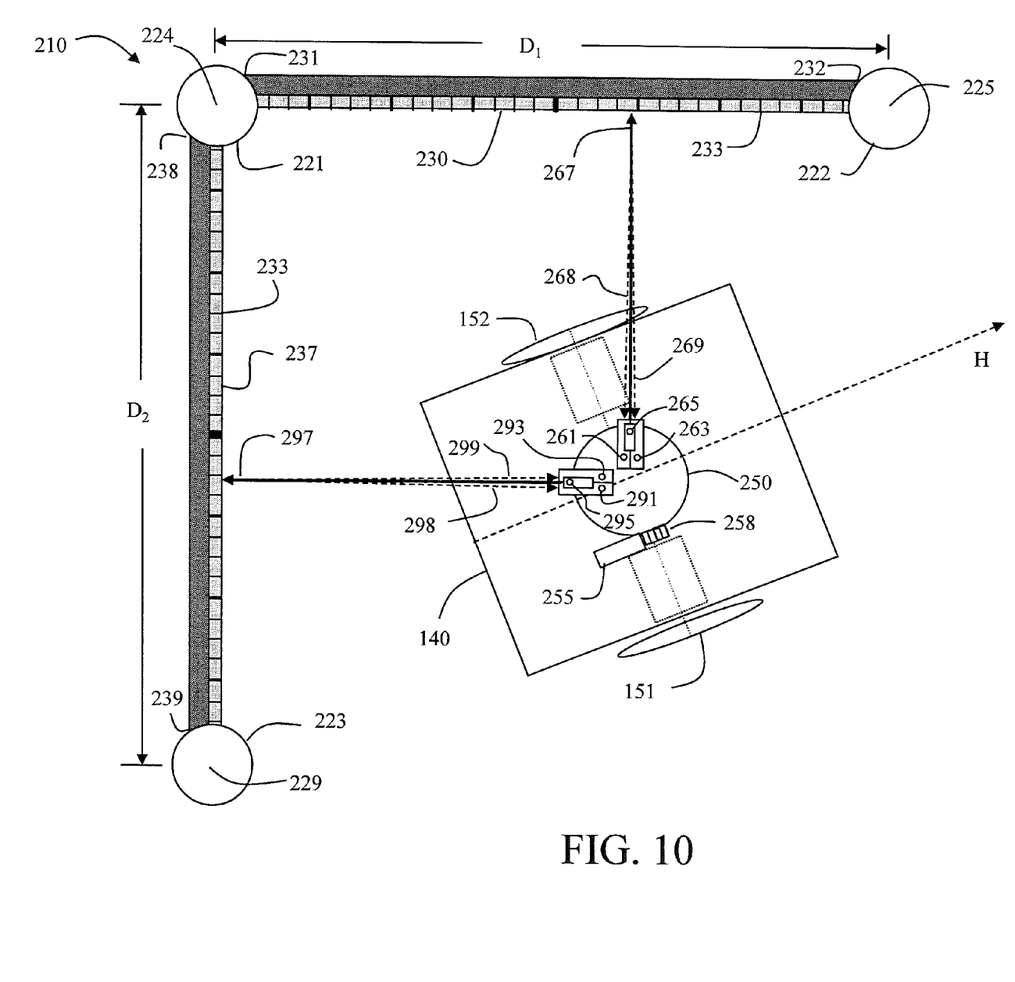
FIG. 10 schematically shows a position-referenced mobile system according to another embodiment of the invention.

FIG. 10 schematically shows the position referencing structure 210 where the linear reference member 230 is a first linear reference member, and there is a second linear reference member 237 that is aligned perpendicular or substantially perpendicular to the first linear reference member 230. The second linear reference member 237 has a first end 238 that is near first reflective cylindrical surface 221 and a second end 239 opposite first end 238. A third reflective cylindrical surface 223 is located at second end 239 of second linear reference member 237. The axis 224 of first reflective cylindrical surface 221 is disposed at a predetermined distance D2 from axis 229 of third reflective cylindrical surface 223. In the example shown in FIG. 10 both the first linear reference member 230 and the second linear reference member 237 include a plurality of reference markings 233. In addition, in this example where the laser 265 is a first laser, there is a second laser 295, a third photo detector 291 and a fourth photo detector 293 that are packaged and configured similarly to the first laser 265, the first photo detector 261 and second photo detector 263 respectively. In addition, the first laser 265 and the second laser 295 are oriented perpendicular or substantially perpendicular to each other. The second laser 295 emits a second incident beam 297. Third reflected beam 298 is received by the third photo detector 291. A fourth reflected beam 299 is received by the fourth photo detector 293. By detecting orientations of strong reflections from the second laser 295 from the second linear reference member 237, the first reflective cylindrical surface 221 and the third reflective cylindrical surface 223 as a function of angle in a similar fashion to that described above relative to FIG. 6, a second measurement of position coordinates of the mobile apparatus 140 is calculated to provide greater measurement reliability. In particular, a fourth orientation corresponding to perpendicularity of the second laser 295 to the position referencing structure 210 (in particular to first reflective cylindrical surface 221), a fifth orientation corresponding to perpendicularity of the second laser 295 to the position referencing structure 210 (in particular to second linear reference member 237), and a sixth orientation corresponding to perpendicularity of the second laser 295 to the position referencing structure 210 (in particular to third reflective cylindrical surface 223) are identified and used along with second predetermined distance $D_2$ to recalculate the position of mobile apparatus 140.

An advantage of providing the additional check of the position coordinates by adding the second linear reference member 237 and the third reflective cylindrical surface 223 is that the accuracy of the system is improved when the mobile apparatus 140 is at greater distances from position referencing structure 210. For the position referencing structures 210 arrayed along a single direction (as in FIG. 1), there is a region adjacent and parallel to the linear reference member 230 that is a few inches wide where the accuracy of position calculation is less accurate. For the positioning referencing structures 210 arrayed along two directions (as in FIG. 10), the region of less accuracy is confined to a smaller region within a few inches of the first reflective cylindrical surface 221. In addition, a position referencing structure having reference markings arrayed along two directions (FIG. 10) provides XY data to the mobile apparatus 140 as it moves in any direction. The positioning reference structure 210 having reference markings along a single direction (FIGS. 7-8) provides position data to mobile apparatus 140 in a single direction.

Some embodiments include the position referencing system 210 arrayed along two directions (as in FIG. 10), but only have the laser 265, the first photo detector 261 and the second photo detector 263 on the mobile apparatus 140. In such embodiments a first calculation is based on orientations of strong reflection of the laser 265 from the first reflective cylindrical surface 221, the first linear reference member 230 and the second reflective cylindrical surface 222 to determine position of the mobile apparatus 140. The position calculation can be checked using orientations of strong reflections of the laser 265 from the first reflective cylindrical surface 221 (again), the second linear reference member 237 and the third reflective cylindrical surface 223.

Figures 11, 12:
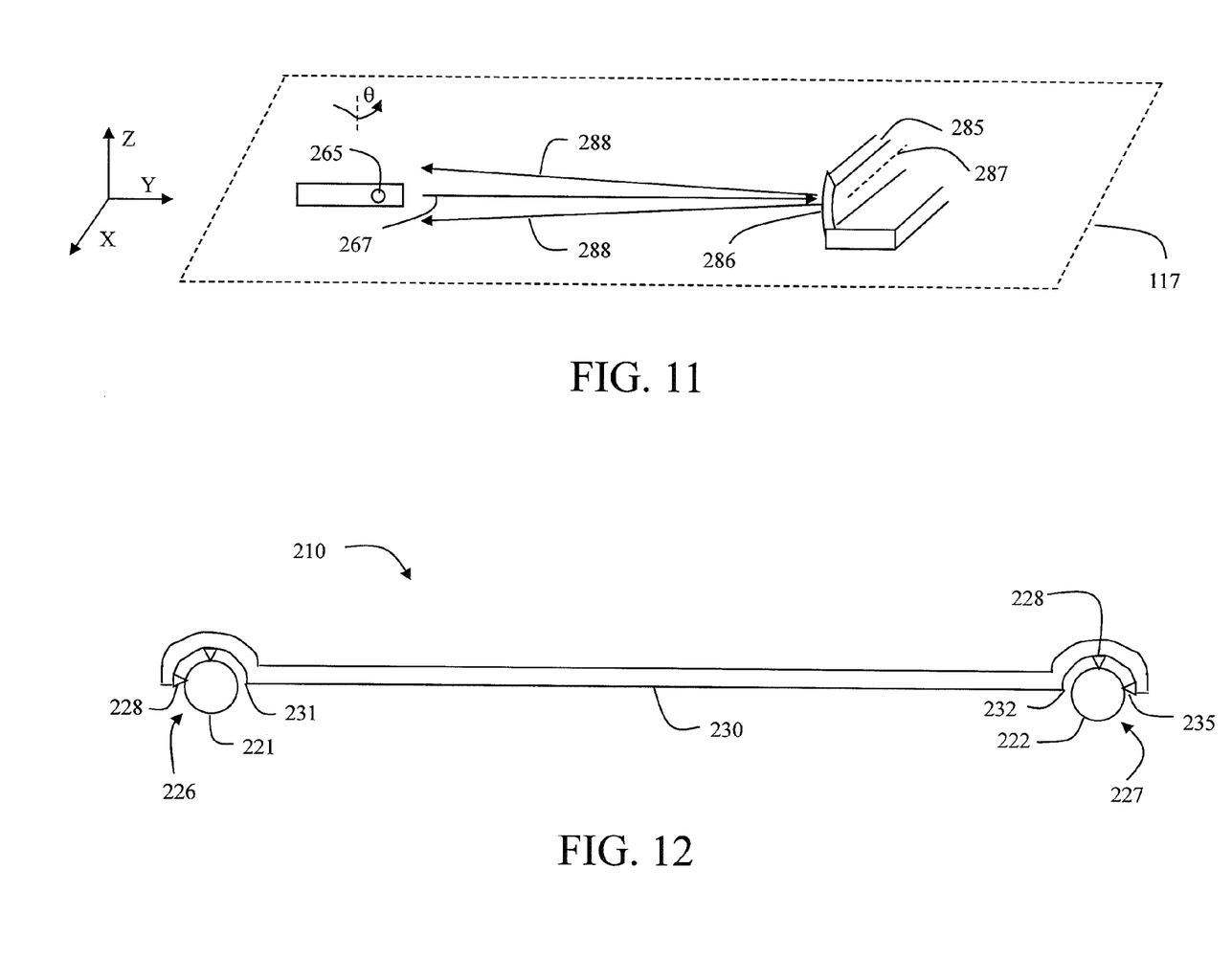
FIG. 11 shows an embodiment of a linear reference member having a curved surface.
FIG. 12 shows an embodiment of a positioning referencing structure made of parts that are assembled together.

Still other embodiments provide a linear reference member 285 having a curved surface 286 having an axis 287 that is parallel or substantially parallel to the XY plane of motion 117 as shown in FIG. 11. As a result, when the laser 265 emits the incident beam 267 so that it reflects off the curved surface 286, the reflected beam 288 is elongated into a narrow line along the Z direction. The reflected beam 288 is still narrow for accurate orientation detection as a function of rotation angle θ in the XY plane. The elongation of the reflected beam 288 in the Z direction facilitates horizontal alignment of the laser 265 and the first and second photo detectors 261 and 263 as compared to the linear reference member 230 having a flat reflecting surface, especially if the flat reflecting surface is not quite perpendicular to the XY plane of motion 117.

In some embodiments, the position referencing structure 210 is formed as a single unit, for example by injection molding and metal coating the surfaces to make them reflective. In other embodiments, such as the configuration shown in the top view of FIG. 12, the first reflective cylindrical surface 221 is part of the first cylinder 226, and the second reflective cylindrical surface 222 is part of a second cylinder 227. The first cylinder 226 and second cylinder 227 are positioned respectively at the first end 231 and the second end 232 of linear reference member 230. In such embodiments it can be advantageous to provide alignment features 228 at the first end 231 and the second end 232 for accurately positioning the first cylinder 226 and the second cylinder 227.

Figure 13:
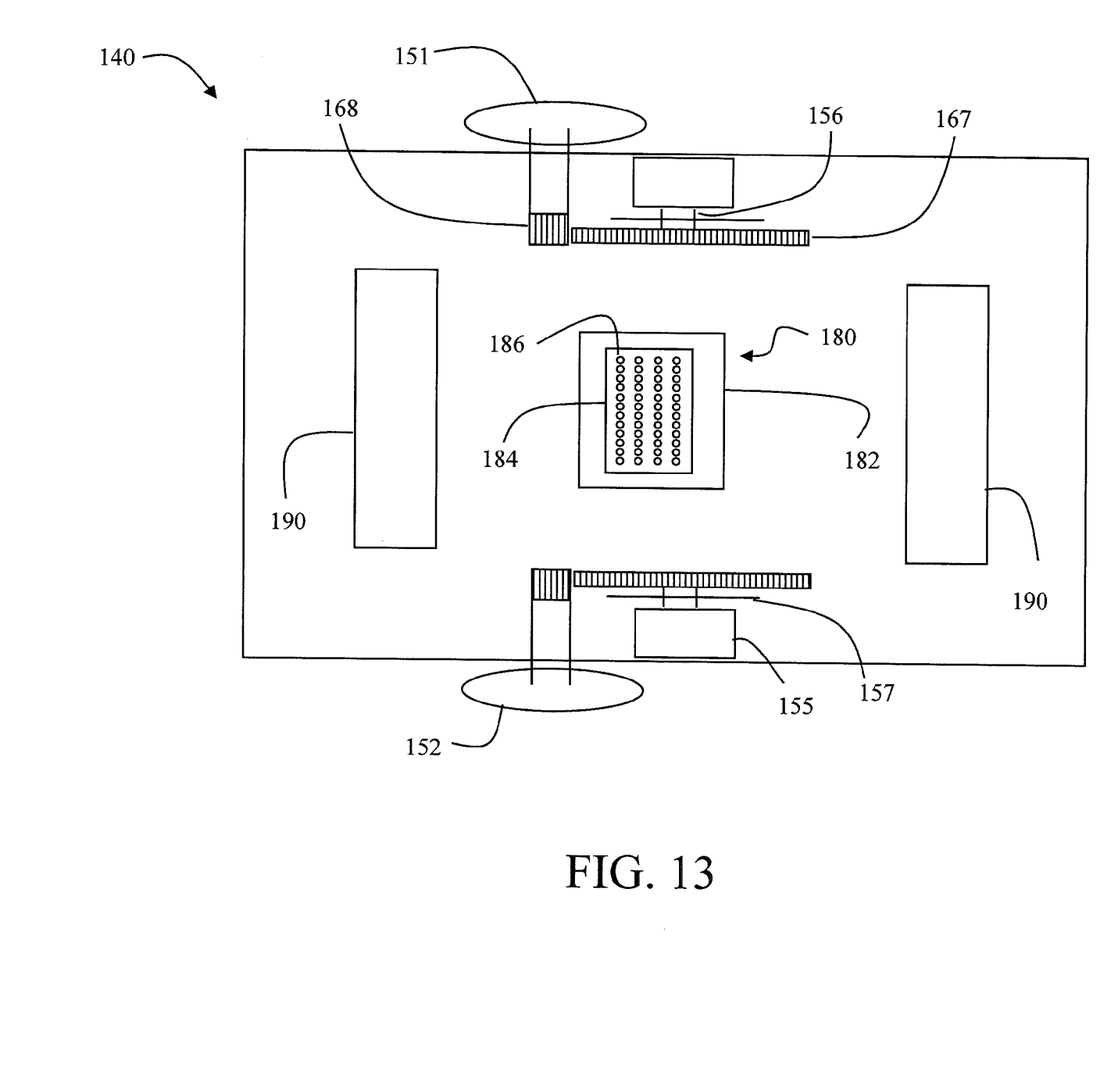
FIG. 13 shows a bottom view of the mobile apparatus including an operating device for performing an operation as a function of position of the mobile apparatus.

A bottom schematic view of a portion of mobile apparatus 140 is shown in FIG. 13. The first wheel 151 and the second wheel 152 are shown with their respective wheel gears 168. The first motor 155 drives the first wheel 151 via a motor gear 167 that engages wheel gear 168. The rotary encoder 157 on the shaft 156 monitors the amount of wheel rotation by measuring the amount of motor rotation. Similarly, the second motor 155 drives the second wheel 152 via a motor gear 167 that engages wheel gear 168. The rotary encoder 157 on the shaft 156 monitors the amount of wheel rotation by measuring the amount of motor rotation. The first and second wheels 151 and 152 can therefore be driven and monitored independently of each other. Also shown in FIG. 13 is an operating device 180 for performing an operation directed by the controller 170 (FIG. 1) as a function of detected position of the mobile apparatus 140. In the example shown in FIG. 13, the operating device 180 includes a marking device. In particular, the marking device is a printhead 182 having a printhead die 184 containing an array of nozzles 186 for ejecting drops of liquid. The drops of liquid can include colored inks, such that ejecting at least one drop of liquid as a function of location of the mobile apparatus 140 includes printing a portion of an image on a sheet of medium 115 (FIG. 1) with which the first and second wheels 151 and 152 are in contact. Alternatively the drops of liquid can include solutions including conductive particles, resistive particles, insulating particles, semiconducting particles or magnetic particles for functional printing as a function of location of the mobile apparatus 140 in order to fabricate a device or a circuit according to control signals by controller 170 (FIG. 1). More generally performing an operation by the operating device 180 includes modifying a surface (such as a surface of sheet of medium 115) over which the mobile apparatus 140 is moved. Modifying the surface can include marking the surface, depositing liquid drops on the surface (as described above), illuminating the surface, heating the surface, or cutting the surface for example. Alternative types of the operating devices 180 (in addition to a printhead 182 for depositing liquid drops) include a laser for illumination or heating, or a blade for cutting the surface. Also shown in FIG. 13 is at least one photosensor array 190 for detecting an edge of sheet of the medium 115 in order to properly position the surface modification relative to sheet of medium 115. The photosensor array 190 can also provide feedback about previously modified or marked regions of sheet of the medium 115.

A method of performing an operation by the operating device 180 on the mobile apparatus 140 as a function of position of the mobile apparatus has been provided. The method includes determining successive positions of the mobile apparatus 140 as described above with reference to FIGS. 1 to 11. In particular, a position of a first location of the mobile apparatus 140 is calculated with reference to the position referencing structure 210. A signal is then sent from the controller 170 to the operating device 180 to perform an operation. Then the mobile apparatus 140 is moved away from the first location to a second location. The position of the second location is calculated. A signal is sent from the controller 170 to the operating device 180 to perform an operation corresponding to the second location. The process of moving to a new location and performing an operation corresponding to that location is typically repeated many times to complete a task such as printing an image on a sheet of the medium 115.

In some embodiments it is desired to avoid having the first and second wheels 151 and 152 or balls 153 run over a region where the surface has been modified. For example, a functional device that is fabricated by ejecting drops of solutions including conductive particles, resistive particles, insulating particles, semiconducting particles or magnetic particles can potentially be degraded if it is subsequently run over. For functional devices having a width that is less than the distance between the first wheel 151 and the second wheel 152, and also less than the distance between the balls 153, accurate knowledge of the past and present positions of the mobile apparatus 140 as well as the printed location of the functional device can allow the controller 170 to select paths of motion of the mobile apparatus 140 that do not include running over the printed functional device.

The invention present has been described in detail with particular reference to certain preferred embodiments thereof, but it will be understood that variations and modifications can be effected within the scope of the invention.

Parts List

110 Position detection region
115 Sheet of medium
117 Plane of motion
140 Mobile apparatus
141 First edge
142 Second edge
143 Chassis
145 First rotational direction (forward)
150 Transport mechanism
151 First wheel
152 Second wheel
153 Ball (or caster)
154 Hub
155 Motor
156 Shaft
157 Rotary encoder (for wheels)
158 Radial line(s)
159 Detectable reference position
167 Motor gear
168 Wheel gears
170 Controller
175 Power source
180 Operating device
182 Printhead
184 Printhead die
186 Array of nozzles
190 Photosensor array
200 Position-referenced mobile system
210 Position referencing structure
217 Detection plane
221 First reflective cylindrical surface
222 Second reflective cylindrical surface
223 Third reflective cylindrical surface
224 Axis (of first reflective cylindrical surface)
225 Axis (of second reflective cylindrical surface)
226 First cylinder
227 Second cylinder
228 Alignment features
229 Axis (of third reflective cylindrical surface)
230 Linear reference member
231 First end (of linear reference member)
232 Second end (of linear reference member)
233 Reference marking(s)
234 First reference marking
235 Second reference marking
236 Shading gradient
237 Second linear reference member
238 First end (of second linear reference member)
239 Second end (of second linear reference member)
242 First axis
244 Second axis
245 Third Axis
250 Turret
251 Rotational axis (of turret)
252 Rotational direction (of turret)
254 Shaft (of turret motor)
255 Turret motor
256 Shaft (of turret)
257 Rotary encoder (for turret)
258 Gear
259 Gear
260 Position detection assembly
261 First photo detector
262 First hollow tube
263 Second photo detector
264 Second hollow tube
265 Laser
266 Cylindrical package
267 Incident beam
268 First reflected beam
269 Second reflected beam
271 Signal amplitude (from first photo detector)
272 Signal amplitude (from second photo detector)
273 Peak (of signal amplitude from first photo detector)
274 Peak (of signal amplitude from second photo detector)
275 First direction
276 Predetermined threshold
281 First vector
282 Second vector
283 Third vector
285 Linear reference member
286 Curved surface
287 Axis (of curved surface)
288 Reflected beam
291 Third photo detector
293 Fourth photo detector
295 Second laser
297 Second incident beam
298 Third reflected beam
299 Fourth reflected beam
D1, D2 Predetermined distance
P Position
H Heading
s Spacing
$\alpha, \beta, \gamma$ Angle

The invention claimed is:

1. A method of determining a position of a mobile apparatus comprising:
    firing a laser that is mounted on the mobile apparatus;
    rotating as a unit the laser and a first and second photo detector that are disposed proximate the laser while monitoring an amount of rotation;
    detecting a first amplitude of light received by the first photo detector and a second amplitude of light received by a second photo detector as a function of the amount of rotation;
    identifying a first orientation corresponding to perpendicularity of the laser to a position referencing structure;
    identifying a second orientation corresponding to perpendicularity of the laser to the position referencing structure;
    identifying a third orientation corresponding to perpendicularity of the laser to the position referencing structure; and
    calculating the position of the mobile apparatus based on the first orientation, the second orientation, the third orientation, and a predetermined distance that is associated with the position referencing structure.

2. The method according to claim 1, wherein rotating the laser and the first and second photo detectors further comprises using a turret motor to rotate a turret on which the laser and the first and second photo detectors are mounted.

3. The method according to claim 2, wherein monitoring the amount of rotation of the turret further comprises analyzing signals from a rotary encoder.

4. The method according to claim 1, wherein identifying an orientation corresponding to perpendicularity of the laser to the position referencing structure includes comparing a signal from the first photo detector to a signal from the second photo detector as a function of the amount of rotation.

5. The method according to claim 4, wherein identifying an orientation corresponding to perpendicularity of the laser to the position referencing structure further includes identifying an orientation such that further rotation in a first direction causes the signal from the first photo detector to increase and the signal from the second photo detector to decrease, and such that further rotation in a direction opposite the first direction causes the signal from the first photo detector to decrease and the signal from the second photo detector to increase.

6. The method according to claim 5, wherein identifying an orientation corresponding to perpendicularity of the laser to the position referencing structure further includes verifying that the signal from the first photo detector and the signal form the second photo detector are at least as large as a predetermined threshold.

7. The method according to claim 1, wherein identifying an orientation is performed by a controller.

8. The method according to claim 1, further comprising:
    identifying a fourth orientation corresponding to perpendicularity of the laser to a position referencing structure;
    identifying a fifth orientation corresponding to perpendicularity of the laser to the position referencing structure; and
    checking the calculated position by recalculating the position of the mobile apparatus based on the third orientation, the fourth orientation, the fifth orientation, and a second predetermined distance that is associated with the position referencing structure.

9. The method according to claim 1, the laser being a first laser, the method further comprising:
    identifying a fourth orientation corresponding to perpendicularity of the second laser to the position referencing structure;
    identifying a fifth orientation corresponding to perpendicularity of the second laser to the position referencing structure;
    identifying a sixth orientation corresponding to perpendicularity of the second laser to the position referencing structure; and
    checking the calculated position by recalculating the position of the mobile apparatus based on the fourth orientation, the fifth orientation, the sixth orientation, and a second predetermined distance that is associated with the position referencing structure.

10. The method according to claim 1, further comprising:
    moving the mobile apparatus away from a first location having the calculated position to a second location; and
    monitoring a distance moved away from the calculated position to the second location.

11. The method according to claim 10, wherein monitoring the distance moved includes using a rotary encoder to measure how much a wheel of known diameter has rotated.

12. The method according to claim 10, wherein monitoring the distance moved includes monitoring a signal from the first photo detector and a signal from the second photo detector while moving the mobile apparatus.

13. The method according to claim 10, further comprising calculating a position of the second location.

14. The method according to claim 10, wherein moving the mobile apparatus comprises:
    selecting a desired heading that is at a first angle relative to the second orientation;
    rotating as a unit the laser and the first and second photo detectors by the first angle;
    controlling the mobile apparatus to rotate such that perpendicularity of the laser to the linear reference member is maintained, so that the mobile apparatus points along the desired heading; and
    moving the mobile apparatus along the desired heading.

15. A method of performing an operation by a device mounted on a mobile apparatus as a function of position of the mobile apparatus, the method comprising:
    firing a laser that is mounted on the mobile apparatus;
    rotating as a unit the laser and a first and second photo detector that are disposed proximate the laser while monitoring an amount of rotation;
    detecting a first amplitude of light received by the first photo detector and a second amplitude of light received by a second photo detector as a function of the amount of rotation;
    identifying a first orientation corresponding to perpendicularity of the laser to a position referencing structure;
    identifying a second orientation corresponding to perpendicularity of the laser to the position referencing structure;
    identifying a third orientation corresponding to perpendicularity of the laser to the position referencing structure; and
    calculating the position of the mobile apparatus based on the first orientation, the second orientation, the third orientation, and a predetermined distance that is associated with the position referencing structure;
    sending a signal from a controller to the device; and
    performing an operation by the device corresponding to the calculated position.

16. The method according to claim 15, the laser being a first laser, the method further comprising:

identifying a fourth orientation corresponding to perpendicularity of the second laser to the position referencing structure;

identifying a fifth orientation corresponding to perpendicularity of the second laser to the position referencing structure;

identifying a sixth orientation corresponding to perpendicularity of the second laser to the position referencing structure; and checking the calculated position by recalculating the position of the mobile apparatus based on the fourth orientation, the fifth orientation, the sixth orientation, and a second predetermined distance that is associated with the position referencing structure.

17. The method according to claim 15, further comprising:
moving the mobile apparatus away from a first location having the calculated position to a second location;
monitoring a distance moved away from the calculated position to the second location;
calculating a position of the second location;
sending a signal from the controller to the device; and
performing an operation by the device corresponding to the second location.

18. The method according to claim 17, wherein monitoring the distance moved includes monitoring a signal from the first photo detector and a signal from the second photo detector while moving the mobile apparatus.

19. The method according to claim 17, wherein moving the mobile apparatus comprises:
selecting a desired heading that is at a first angle relative to the second orientation;
rotating as a unit the laser and the first and second photo detectors by the first angle;
controlling the mobile apparatus to rotate such that perpendicularity of the laser to the linear reference member is maintained, so that the mobile apparatus points along the desired heading; and
moving the mobile apparatus along the desired heading.

20. The method according to claim 15, wherein performing an operation by the device includes modifying a surface over which the mobile apparatus is moved.

21. The method according to claim 20, wherein modifying the surface includes ejecting at least one drop of liquid onto the surface.

22. The method according to claim 21, wherein ejecting at least one drop of liquid further comprises printing a portion of an image.

23. The method according to claim 22, wherein ejecting at least one drop of liquid further comprises functional printing.

24. The method according to claim 20, wherein modifying the surface includes marking the surface.

25. The method according to claim 20, wherein modifying the surface includes cutting the surface.

26. The method according to claim 20, further comprising controlling a path of the mobile apparatus such that wheels of the mobile apparatus do not run over a region where the surface has been modified.

27. The method according to claim 15, further comprising:
moving the mobile apparatus onto a sheet of medium; and
detecting an edge of the sheet of medium.

28. The method according to claim 27, wherein performing an operation by the device includes modifying a surface of the sheet of medium.

29. The method according to claim 28, further comprising controlling a path of the mobile apparatus such that wheels of the mobile apparatus do not run over a region where the surface of the sheet of medium has been modified.

* * * * *